Patented Mar. 17, 1931

1,796,329

UNITED STATES PATENT OFFICE

JOHN A. HEALY, OF PITTSBURGH, PENNSYLVANIA

WELDING COMPOSITION

No Drawing.    Application filed September 16, 1929. Serial No. 393,114.

This invention relates to welding compositions and methods for use in attaching cutting tips to the shanks or other supports thereof.

In mounting cutting tips to the shanks or other supports thereof, and more particularly, in the instance of tungsten carbide tips, it is of extreme importance that the connection or union between these parts be sufficiently strong to resist the shearing tendency and the unusual heat generated as an incident to heavy cuts and the high speeds at which tools of this character must be operated for the purpose of greatest efficiency. It is old, of course, to unite the tips to the shanks by brazing, but tools produced by this method are not satisfactory because of the inability of the same to resist the thrust of the cut and the heat. More specifically, it has been found that the tip is unable to withstand the thrust of the cut combined with the fusing tendency that inevitably accompanies such cut.

Thus, the invention forming the subject of this application will be found to comprise a bonding medium having the strength and heat resisting qualities capable of holding the cutting tip rigidly in place against the contrary influence of the thrust and the heat accompanying the operation of the tool. Another feature of the invention will be found to reside in the method of attachment of the tip to the support therefor to insure the desired intimate union between the tip and the support.

The welding composition embodying the invention consists of a mixture of approximately 30% of fused borax, 60% of ferro-manganese, 10% of ferro-silicon, and a suitable addition of high speed steel filings, these proportions being based on weight and not on volume. Furthermore, these proportions are merely representative of the invention and, in actual practice, I have found that a mixture consisting of approximately 31% fused borax, 61% ferro-manganese, 8% ferro-silicon, as the essential ingredients, will give excellent results. The amount of high speed steel filings added to the mixture of the other ingredients may be greatly varied and, for example, good results may be obtained by adding, to 10 pounds of the mixture of the essential ingredients, any amount of high speed steel filings from 2 pounds to 10 pounds. At this point it will be understood that the borax, ferro-manganese, and ferro-silicon constitute the essential ingredients of the composition.

A more or less conventional mode of procedure in the use of the composition in welding a tip to its shank may consist in first heating both the shank and the tip to from 1400 to 1600 degrees Fahrenheit. The heated parts are then withdrawn and while still in their heated condition, the surfaces to be joined are filed until thoroughly cleaned, and a suitable quantity of the welding composition is then applied to the surfaces, preferably in such a manner as to effect a uniform distribution of the composition over the surfaces. The tip is then placed in position on the shank, and the assemblage of parts, with their coated surfaces in contact, is reintroduced into the furnace and heated to a temperature from 2100 to 2300 degrees Fahrenheit. The assemblage is then withdrawn from the furnace and pressure is exerted upon the tip so as to press it tightly into position upon its seat upon the shank and, after this pressing step, the parts are allowed to cool. It has been found that a cutting tool thus produced is capable of withstanding the excessive heat generated in the operation of making heavy cuts by the use of the tool, in the cutting operations, the tool being also capable of withstanding the stresses incident to high speed cutting.

With reference to the heating steps, referred to above, it will be understood, of course, that heat may be applied to the parts by any means found convenient, although the best results have been obtained by performing the welding operation in a welding machine as this localizes the heat, and the pressure of the welding machine provides the pressure necessary to effect the most uniform and secure union of the tool parts.

The ferro-manganese ordinarily used in this composition is the usual commercial grade which includes about 80% manganese, and the ferro-silicon used is the usual commercial grade which contains about 50% silica.

Having thus described the invention, what is claimed is:

1. A welding composition comprising the following ingredients in approximately the proportions stated:—fused borax, 30%, ferro-manganese 60%, ferro-silicon 10%, and a portion of high speed steel filings.

2. A welding composition comprising the following ingredients in approximately the proportions stated:—fused borax 30%, ferro-manganese 60%, ferro-silicon 10%, and a portion of high speed steel filings ranging from 2 to 10 pounds for each 10 pounds of the total respective proportions of the other ingredients.

In testimony whereof I affix my signature.

JOHN A. HEALY.